US006992811B2

(12) United States Patent
Williams et al.

(10) Patent No.: US 6,992,811 B2
(45) Date of Patent: Jan. 31, 2006

(54) DISPLAY DEVICE

(75) Inventors: David A Williams, Corvallis, OR (US);
Rob Emmons, Corvallis, OR (US);
Guy C. Heagney, Albany, OR (US);
Jim Woods, Corvallis, OR (US);
Daniel H Saiz, Eugene, OR (US); Dave Orth, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/771,790

(22) Filed: Feb. 3, 2004

(65) Prior Publication Data

US 2005/0168796 A1 Aug. 4, 2005

(51) Int. Cl.
*G02B 26/00* (2006.01)
*G03B 21/20* (2006.01)
(52) U.S. Cl. ........................ 359/291; 353/85
(58) Field of Classification Search ................ 359/223, 359/224, 290, 291; 348/730, 739, 744, 790, 348/800; 315/157, 158, 169.3, 290, 360; 345/102; 349/61; 353/85
See application file for complete search history.

(56) References Cited

U.S. PATENT DOCUMENTS

| 5,134,491 | A | * | 7/1992 | Muraji et al. ................ 348/744 |
| 5,136,397 | A | | 8/1992 | Miyashita |
| 5,835,083 | A | | 11/1998 | Nielsen et al. |
| 6,460,999 | B1 | | 10/2002 | Suzuki ........................ 353/79 |
| 6,472,828 | B1 | | 10/2002 | Pruett et al. ................ 315/225 |
| 6,543,900 | B2 | * | 4/2003 | Noji et al. .................... 353/94 |
| 6,588,907 | B1 | | 7/2003 | Billington et al. ............ 353/57 |
| 2001/0013856 | A1 | | 8/2001 | Hamakada et al. |
| 2002/0163626 | A1 | | 11/2002 | Takizawa et al. |
| 2003/0218602 | A1 | | 11/2003 | Naito ........................ 345/204 |

FOREIGN PATENT DOCUMENTS

| DE | 28 40 546 | 12/1979 |
| DE | 102 09 631 A1 | 9/2003 |
| EP | 1 473 588 A1 | 11/2004 |

OTHER PUBLICATIONS

Tanenbaum, Andrew S. "Structured Computer Organization" 1984, Prentice-Hall Inc. Second Edition. pp. 11-12.*
"LED Safety", Reference Guide, no date provided.
EP 04 018 488.9, no date provided.
HP XP8010 Series Digital Projector Reference Guide, no date provided.

* cited by examiner

*Primary Examiner*—Georgia Epps
*Assistant Examiner*—William Choi

(57) ABSTRACT

Display devices, display device methods and display device software that allows users to, for example, immediately return a display device to the powered up state when a power button is inadvertently pressed.

44 Claims, 3 Drawing Sheets

DISPLAY DEVICE

BACKGROUND OF THE INVENTIONS

1. Field of the Inventions

The present inventions are related to display devices such as, for example, projectors.

2. Description of the Related Art

Projectors, which are one type of display device, are used to display images on screens and other projection surfaces. Projectors typically include a light source (such as a lamp) that is turned on as part of the power up process when the projector is turned on, and is turned off as part of the power down process when the projector is turned off. Many light sources operate at a relatively high temperature and, when the projector is turned off, it takes a considerable amount of time (often a few minutes or more) to cool the light source down to the temperature at which it can be turned back on. Accordingly, when a projector is turned off, it cannot be immediately turned back on. This is true even when a cooling fan is used to accelerate the cooling process.

The inability to immediately turn a projector back on after it has been turned off is relatively inconsequential under normal circumstances. However, in those instances where the user turns the projector off prior to the end of a presentation (either by intentionally or inadvertently pressing the power button), the delay can be quite frustrating. One proposed solution is to force the user to confirm that he or she intends to turn off the projector after the power button is initially pressed. More specifically, instead of simply beginning the power down process when the power button is pressed, some projectors will display a message indicating that the user must press the power button a second time in order to initiate the power down process. The projector will remain in this "waiting for confirmation" state until the user presses the power button a second time.

The present inventors have determined that forcing the user to press the power button a second time is a less than satisfactory solution to the inadvertent power down problem. For example, pressing the power button a second time to confirm that the projector is to be turned off can be quite annoying and inconvenient in those instances where the user desires to immediately move on to the next portion of the presentation or meeting, e.g. answering questions or closing sales. Additionally, in those instances in which the user's back is to the projection surface, the user will not see the message. If he or she forgets that the button must be pressed a second time, the projector will continue to shine light on the screen and distract the audience from subsequent portions of the user's presentation.

BRIEF DESCRIPTION OF THE DRAWINGS

Detailed description of embodiments of the inventions will be made with reference to the accompanying drawings.

DETAILED DESCRIPTION OF THE EMBODIMENTS

Figure 1:
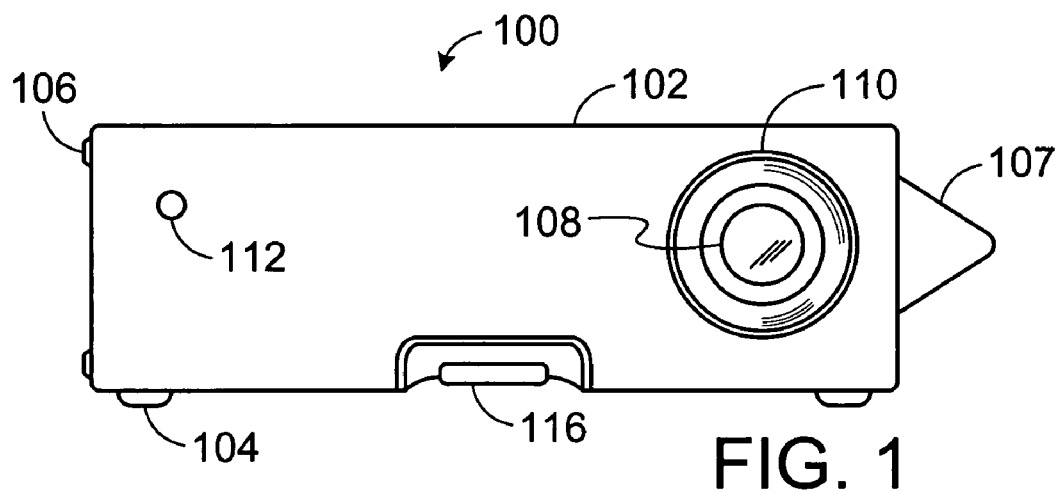
FIG. 1 is a front view of a projector in accordance with an embodiment of a present invention.

The following is a detailed description of the best presently known modes of carrying out the inventions. This description is not to be taken in a limiting sense, but is made merely for the purpose of illustrating the general principles of the inventions. It is noted that detailed discussions of projectors and other display devices that are not pertinent to the present inventions, such as image processing, have been omitted for the sake of simplicity. The present inventions are also applicable to a wide range of projector technologies and systems, including those presently being developed or yet to be developed. For example, although the exemplary display device described below is a digital light processing ("DLP") projector, other types of projectors, such as liquid crystal display ("LCD"), cathode ray tube ("CRT") and liquid crystal on silicon ("LCOS"), are equally applicable to the present inventions. Other types of display devices, such as monitors, are also applicable to the present inventions.

One example of a projector 100 in accordance with an embodiment of a present invention is, with respect to many of the structural and operating components, substantially similar to the Hewlett-Packard xp8010 digital projector. The exemplary projector, which is generally represented by reference numeral 100 in FIGS. 1–3, includes a housing 102 that is supported on feet 104. Side feet 106 support the projector in those instances where the user places the projector on its side. A handle 107 may be used to carry the projector.

Figure 2:
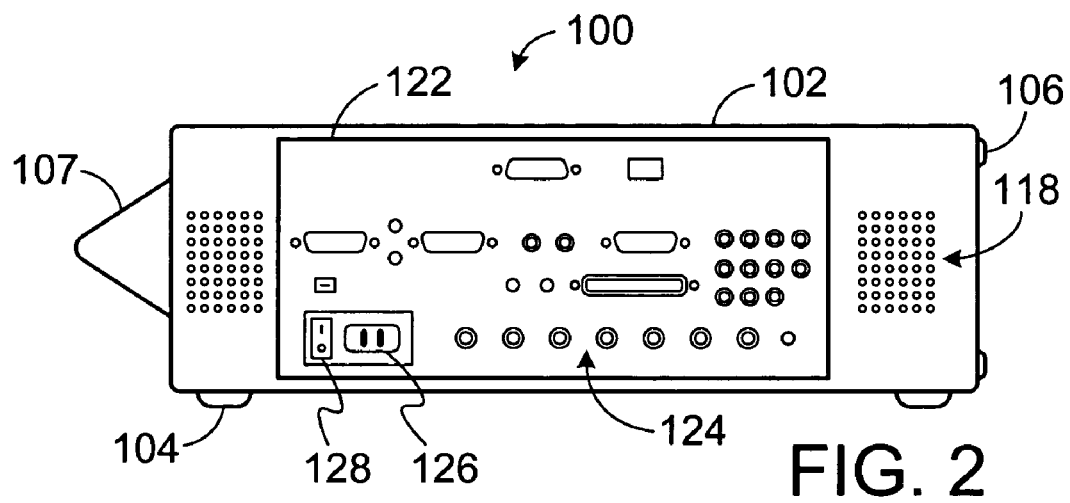
FIG. 2 is a rear view of the projector illustrated in FIG. 1.
Figure 3:
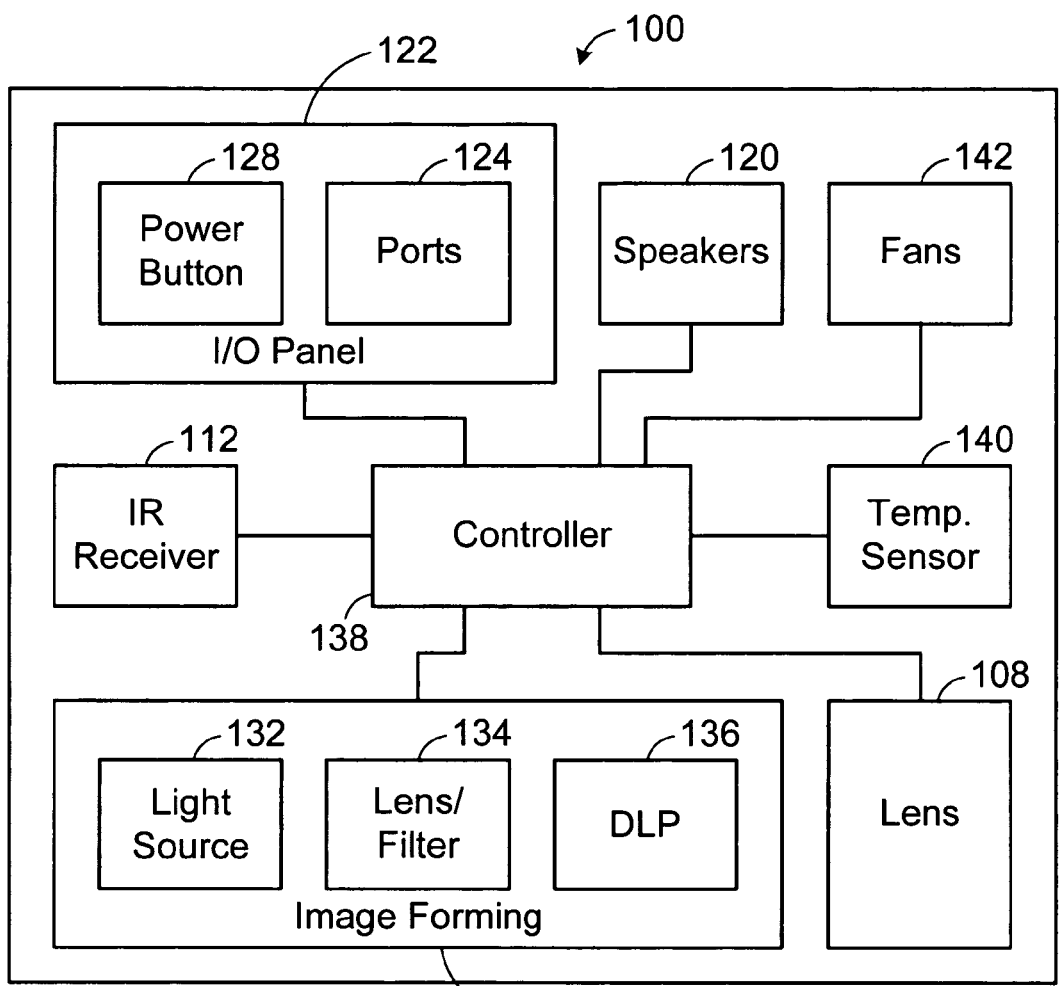
FIG. 3 is a diagrammatic view of a projector in accordance with an embodiment of a present invention.
Figure 3A:
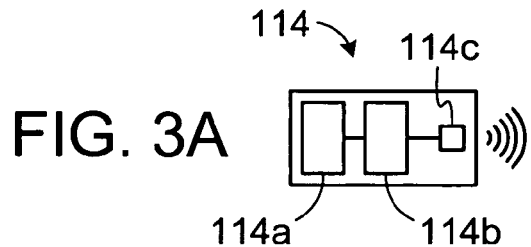
FIG. 3A is a diagrammatic view of a remote control in accordance with an embodiment of a present invention.

In the exemplary embodiment illustrated in FIGS. 1–3, a projection lens 108, focus knob 110 and IR receiver 112 are associated with the front side (i.e. projection surface facing side) of the housing 102. The IR receiver 112 may be used to receive signals from a wireless remote control unit 114 which, as illustrated in FIG. 3A, has a keypad 114a, circuitry 114b and IR emitter 114c. The keys on the keypad 114a may include, for example, up, down, left, right, enter and power buttons. The remote control unit may be operably connected to the projector 100 by way of a wire or an RF emitter/receiver arrangement instead of the IR emitter 114c. A handle 116, which allows the user to raise and lower the front two of the feet 104, is also associated with the front side of the housing 102. The rear side (i.e. the viewer facing side) of the housing 102 includes two sets of apertures 118 for speakers 120 (FIG. 3) and an I/O panel 122. The I/O panel 122 includes a plurality of plugs, ports and connectors which are generally represented by reference numeral 124. The various plugs, ports and connectors may include, but are not limited to, audio and video input and output ports, USB ports, VGA ports, RS232 ports, LAN ports, wired control inputs and outputs, and a security slot. An AC plug 126, which is configured to be connected to a power cord, and a power button 128, which may be used to turn the projector 100 on and off, are also provided on the I/O panel 122.

The exemplary projector 100 includes various image forming components. Although the present inventions are not limed to any particular type of projector, the exemplary projector 100 is a DLP projector. Referring more specifically to FIG. 3, the image forming components 130 include a light source 132 (such as an ultra high pressure mercury lamp), a lens and color filter arrangement 134, and a DLP board 136. The DLP board 136 will typically have a processor, memory and a digital mirror device. The image forming components 130 receive, process and project image information in conventional fashion. For example, the digital mirror device includes a plurality of micro-mirrors that may be tilted either toward the light source 132 or away from the light source. Each micro-mirror reflects light received from the light source 132, by way of the lens and color filter arrangement 134, through the projection lens 108 and represents a pixel on the projection surface. A pixel will be ON (or light) when the corresponding micro-mirror is tilted toward the light source 132 and will be OFF (or dark) when the corresponding micro-mirror is tilted away from the light source.

Referring to FIG. 3, the overall operations of the exemplary projector 100 are controlled by a projector controller 138, which consists of suitable hardware (including a processor and/or combinational logic circuitry), software stored in local memory, and/or firmware components. With respect to software stored in memory, computer memory such as semiconductor based memory (e.g. RAM), magnetic readable memory, optical readable memory, and network accessed memory, to name a few, may be employed. The operations include, for example, controlling the power up and power down processes. Many of the operations, including the power up and power down processes, occur in response to a command from the user or from a connected device, such as a personal computer. With respect to the power down process, the process is typically initiated by a power command from the user by way of the power button 128 or a power button on the remote control keypad 114a. Nevertheless, it should be noted that the power command could also be in the form of a power command from a connected computer, an audible command from a user in a voice actuated system, a power signal from a touch screen associated with the projector, the remote control or some other device, or a laser pointer (with signals embedded in the laser point). The controller 138 also receives signals from a temperature sensor 140, such as a thermocouple or thermistor, which monitors the temperature of the light source 132. The controller 138 may, for example, use the temperature information to regulate the temperature of the light source 132 by controlling the speed of the light source cooling fans 142. The fans 142 are also used to cool the light source 132 after the projector has been powered down.

One example of a method by which the exemplary controller 138 controls the power up and power down processes in accordance with one aspect of the present inventions proceeds in the manner described below. In the exemplary embodiment, the method will be controlled by software run by the controller 138. The software generates a plurality of instructions that are executed by the controller 138.

Figure 4:
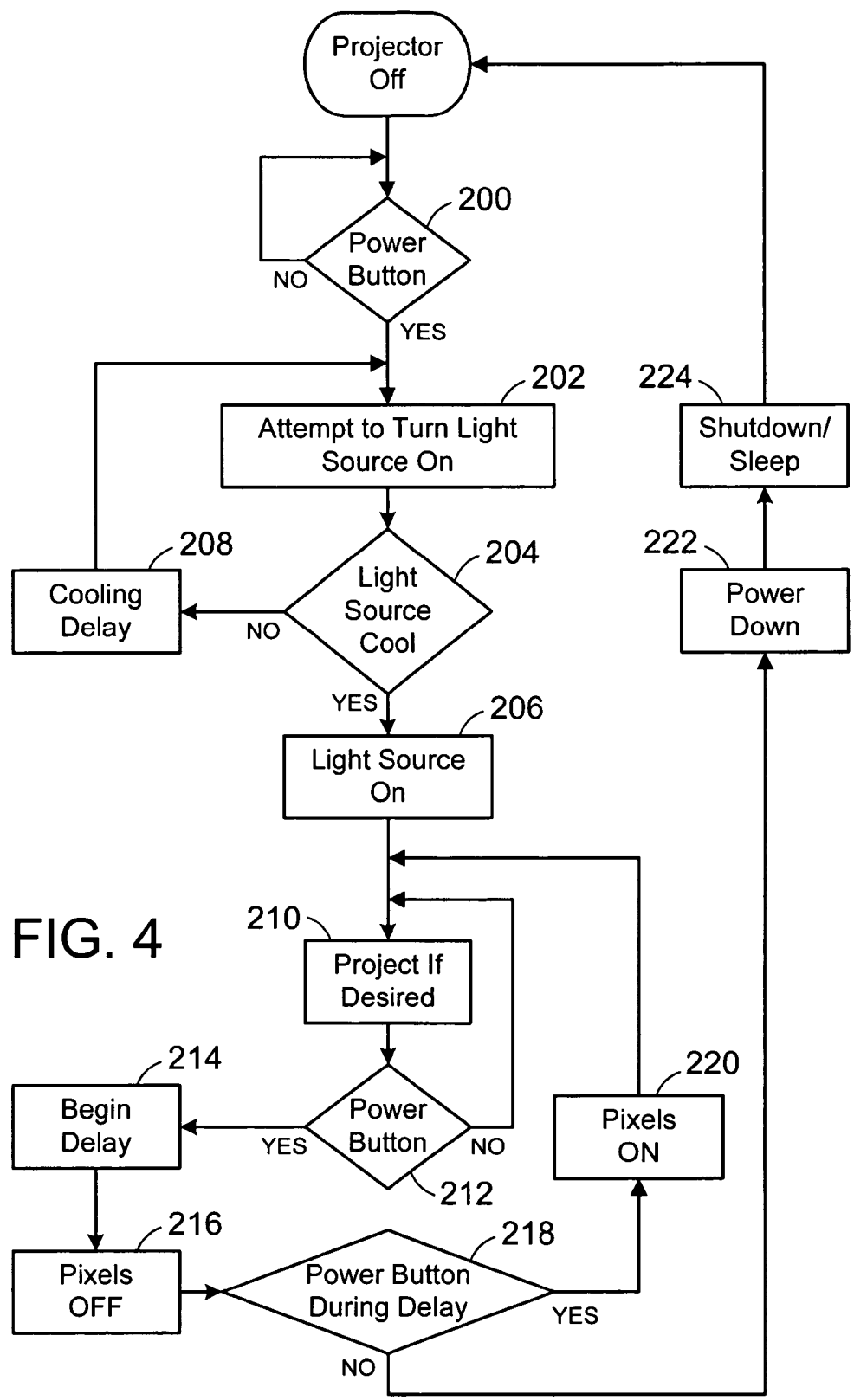
FIG. 4 is a flow chart showing a projector operation method in accordance with an embodiment of a present invention.

Turning to FIG. 4, after receiving a signal from the power button 128, the remote control unit 114, or other device (Step 200) when the projector is off or in sleep mode, where minimal circuitry is powered, the controller 138 will attempt to turn on the light source 132 whether or not the light source is at or below the strike temperature (Step 202). If the light source 132 is at or below the strike temperature, the light source will be turned on (Steps 204 and 206). If not, the controller 138 will wait for a predetermined period of time (Step 208), while the fans 142 continue to cool the light source 132, and then re-attempt to turn the light source on (Step 202). Each time the controller 138 attempts to restart the light source, the projector will reset itself and the projector circuitry will be restarted in anticipation of the light source 132 being turned on. After the light source 132 has cooled down to the strike temperature, the next attempt by the controller 138 will be successful and the light source will turn on (Step 206). At this point, the projector 100 is powered up (or "ON") and may be used as desired to project images onto a projection surface and/or transmit sounds (Step 210).

The projector 100 will continue to operate in conventional fashion until the controller receives a power command. In the exemplary embodiment, the power command is in the form of a signal from the power button 128, a power button on the remote control keypad 114a, or other device (Step 212). Instead of immediately beginning the power down process, the exemplary projector 100 will give the user the opportunity to prevent the power down process from proceeding. More specifically, the controller 138 will begin a delay period of, for example, about 3 to 5 seconds during which the user can prevent the initiation of the power down process (Step 214). In some implementations, the controller 138 will also cause all of the pixels to go to the OFF (or black) state so that no light is projected onto the projection surface (Step 216) during the delay period. The controller 138 may, alternatively, cause the projector to display a message in a small portion of the projection surface which indicates that the user has an opportunity to prevent the projector from shutting down during the delay period (with the substantial majority being black). The message may, if desired, also display the amount of time remaining before the power down process begins, i.e. the amount of time remaining in the delay period.

The initiation of the power down process in the exemplary embodiment may be prevented by sending the controller 138 a second power command prior to the end of the delay period (Step 218). The second power command in the exemplary implementation is in the form of a second signal from the power button 128, a power button on the remote control keypad 114a, or other device. If the controller 138 receives the second power command prior to the end of the delay period, the controller will not perform the power down process and, instead, will turn the pixels back ON (or light) and maintain the projector 100 in the powered up state (Step 220) where it may be used as desired to project images onto a projection surface and/or transmit sounds (Step 210). In those instances where the projector 100 was projecting images onto a projection surface when the first power command was received by the controller 138, the pixels will return to the respective states necessary to form the image. Although some of the pixels may be OFF in order to produce a particular image, the pixels as a group would be considered ON.

If, on the other hand, the controller 138 does not receive a second power command prior to the end of the delay period, the controller will begin the power down process which includes, among other things, turning the light source 132 off (Step 222). The projector 100 will then go into the low power sleep mode or completely power down (Step 224).

There are a number of advantages associated with present projector and the manner in which it responds to power commands. For example, the present projector provides users with an opportunity to prevent the power down process, as well as the delay associated with restarting the projector, in those instance where the power button 128 or a power button on the remote control keypad 114a is inadvertently pressed or purposefully pressed by mistake. The present projector also accomplishes this in a manner that does not require the user to perform additional operations after pressing the power button in those instances where the user did, in fact, correctly and intentionally turn off the projector. The projector will simply turn off at the end of the brief delay period.

Although the present inventions have been described in terms of the preferred embodiments above, numerous modifications and/or additions to the above-described preferred embodiments would be readily apparent to one skilled in the art. By way of example, but not limitation, the present inventions may be incorporated into projectors that include separate power-on and power-off buttons. Here, the power-off button will be monitored in Step 212 and either button will be monitored in Step 218. Additionally, the 3 to 5 second period may be extend on the low end to 2 seconds and the high end to 10 seconds or more. It is intended that the scope of the present inventions extend to all such modifications and/or additions.

We claim:

1. A display device, comprising:
 an image formation apparatus; and
 a controller, operably connected to the image formation apparatus, configured to perform a power down process after a predetermined delay period in response to a receipt of a first power command, to not perform the power down process in response to a receipt of a second power command prior to the end of the predetermined delay period, and to control the image formation apparatus to display a message concerning the opportunity to prevent the power down process prior to the end of the predetermined delay period.

2. A display device as claimed in claim 1, wherein the image formation apparatus includes a light source.

3. A display device as claimed in claim 2, further comprising:
 a lens adapted to focus light from the light source onto a projection surface in spaced relation to the display device.

4. A display device as claimed in claim 1, wherein the predetermined delay period is at least two seconds.

5. A display device as claimed 1, wherein
 the image formation apparatus creates a plurality of pixels on a display surface; and
 the controller is configured to control the image formation apparatus such that a majority of the pixels are in an OFF state during the predetermined delay period and the message is displayed on a relatively small portion of the display surface.

6. A display device as claimed 5, wherein the controller is configured to control the image formation apparatus such that the pixels are returned to an ON state in response to the receipt of a second power command prior to the end of the predetermined delay period.

7. A display device as claimed in claim 1, wherein the image formation apparatus includes a plurality of mirrors.

8. A display device as claimed in claim 1, further comprising:
 a power button that generates the first and second power commands.

9. A display device as claimed in claim 8, wherein the power button is associated with a remote control.

10. A display device as claimed in claim 1, wherein the message includes an amount of time remaining in the predetermined delay period.

11. A display device, comprising:
 an image formation apparatus, adapted to produce a plurality of pixels having an ON state and an OFF state, including a light source having and ON state and an OFF state; and
 a controller, operably connected to the image formation apparatus, configured to (1) switch the light source to the ON state in response to a first power command, (2) switch at least a substantial majority of the pixels to the OFF state and to maintain the light source in the ON state in response to a second power command, (3) switch some of the pixels to an ON state so as to create a message concerning the opportunity to prevent the light source from being switched to the OFF state prior to the end of a predetermined delay period after the second power command, and (4) switch the light source to the OFF state in response to a failure of a third power command to be received within the predetermined delay period after the second power command.

12. A display device as claimed in claim 11, further comprising:
 a lens adapted to focus light from the light source onto a projection surface in spaced relation to the display device.

13. A display device as claimed in claim 11, wherein the predetermined delay period is at least two seconds.

14. A display device as claimed in claim 11, wherein message includes an amount of time remaining in the predetermined delay period.

15. A display device as claimed in claim 11, wherein the controller is configured to switch the pixels to the ON state and to maintain the light source in the ON state in response to a receipt of a third power command within the predetermined delay period after the second power command.

16. A display device as claimed in claim 11, wherein the image forming apparatus includes a plurality of mirrors.

17. A display device, comprising:
 means for supplying light having an ON state and an OFF state;
 means for creating a plurality of pixels having an ON state and an OFF state with the light;
 means for switching at least a substantial majority of the pixels to the OFF state, while maintaining the means for supplying light in the ON state, in response to a first power command;
 means for switching some of the pixels to the ON state so as to create a message concerning the opportunity to prevent the means for supplying light from being switched to the OFF state prior to the end of a predetermined delay period after the first power command; and
 means for switching the means for supplying light to the OFF state in response to a failure of a second power command to be received within the predetermined delay period after the first power command.

18. A display device as claimed in claim 17, wherein the message includes an amount of time remaining in the predetermined delay period.

19. A display device, comprising:
 means for forming images; and
 means, operably connected to the means for forming images, for performing a power down process after a predetermined delay period in response to a receipt of a first power command, not performing the power down process in response to a receipt of a second power command prior to the end of the predetermined delay period and controlling the means for forming images to display a message concerning the opportunity to prevent the power down process prior to the end of the predetermined delay period.

20. A display device as claimed in claim 19, wherein the message includes an amount of time remaining in the predetermined delay period.

21. A method of operating a display device, comprising the steps of:
 switching a light source to an ON state in response to a first power command;
 directing light from the light source onto a display surface;

preventing the light from the light source from being directed onto a majority of the display surface, while maintaining the light source in the ON state, in response to a second power command;

directing light onto a small portion of the display device in the form of a message concerning the opportunity to prevent the light source from being switched to an OFF state prior to the end of a predetermined delay period after the second power command; and switching the light source to the OFF state in response to a failure of a third power command to be received within the predetermined delay period after the second power command.

22. A method as claimed in claim 21, further comprising the step of:

maintaining the light source in the ON state in response to the receipt of the third power command within the predetermined delay period after the second power command.

23. A method as claimed in claim 22, wherein the message includes an amount of time remaining in the predetermined delay period.

24. A method as claimed in claim 21, wherein the predetermined delay period is at least two seconds.

25. A method as claimed in claim 21, wherein the step of directing light from the light source onto a display surface comprises reflecting light from the light source onto a display surface by turning a plurality of mirrors toward the light source; and the step of preventing the light from the light source from being directed onto a majority of the display surface comprises turning the corresponding mirrors away from the light source, while maintaining the light source to an ON state, in response to a second power command.

26. A method as claimed in claim 21, wherein the step of projecting light comprises projecting an image onto a screen.

27. A method of operating a display device, comprising the steps of:

performing a power down process after a predetermined delay period in response to a receipt of a first power command;

displaying a message concerning the opportunity to prevent the power down process prior to the end of the predetermined delay period; and not performing the power down process in response to a receipt of a second power command prior to the end of the predetermined delay period.

28. A method as claimed in claim 27, further comprising the step of:

switching a plurality of pixels to an OFF state in response to the first power command.

29. A method as claimed in claim 28, further comprising the step of:

switching the plurality of pixels to an ON state in response to the receipt of the second power command prior to the end of the predetermined delay period.

30. A method as claimed in claim 27, wherein the predetermined delay period is at least two seconds.

31. A method as claimed in claim 27, wherein the step of performing a power down process includes the step of turning a light source to an OFF state.

32. A method as claimed in claim 27, wherein the message includes an amount of time remaining in the predetermined delay period.

33. Computer memory encoded with executable instructions for operating a display device, the instructions comprising steps for:

performing a power down process after a predetermined delay period in response to a receipt of a first power command;

controlling the display device to display a message concerning the opportunity to prevent the power down process prior to the end of the predetermined delay period; and not performing the power down process in response to a receipt of a second power command prior to the end of the predetermined delay period.

34. Computer memory as claimed in claim 33, wherein the display device includes a light source and the step of performing a power down process includes placing the light source in an OFF state.

35. Computer memory as claimed in claim 34, wherein the display device includes a light source and the step of performing a power down process includes maintaining the light source in an ON state during the predetermined delay period.

36. Computer memory as claimed in claim 35, wherein the step of not performing the power down process includes maintaining the light source in the ON state after the end of the predetermined delay period.

37. Computer memory as claimed in claim 33, wherein the predetermined delay period is at least two seconds.

38. Computer memory as claimed in claim 33, wherein the display device creates a plurality of pixels on a display surface, the instructions further comprising steps for:

placing a majority of the pixels in an OFF state during the predetermined delay period.

39. Computer memory as claimed in claim 33, wherein the first and second power commands comprise signals from a power button.

40. Computer memory as claimed in claim 33, wherein the message includes an amount of time remaining in the predetermined delay period.

41. Computer memory encoded with executable instructions for operating an image formation apparatus, the image formation apparatus being adapted to produce a plurality of pixels having an ON state and an OFF state and including a light source having an ON state and an OFF state, the instructions comprising steps for:

switching the light source to an ON state in response to a first power command;

switching at least a substantial majority of the pixels to the OFF state and for maintaining the light source in the ON state in response to a second power command;

switching some of the pixels to the ON state so as to create a message concerning the opportunity to prevent the light source from being switched to the OFF state prior to the end of a predetermined delay period; and switching the light source to the OFF state in response to a failure of a third power command to be received within a predetermined delay period after the second power command.

42. Computer memory as claimed in claim 41, wherein the predetermined delay period is at least two seconds.

43. Computer memory as claimed in claim 41, wherein the message includes an amount of time remaining in the predetermined delay period.

44. Computer memory as claimed in claim 41, the instructions further comprising steps for:

switching the pixels to an ON state and maintaining the light source in an ON state in response to a receipt of a third power command within the predetermined delay period after the second power command.

* * * * *